United States Patent [19]

Deckert

[11] 4,420,780
[45] Dec. 13, 1983

[54] SELF-LOADING MAGNETIC HEAD AIR BEARING SLIDER

[75] Inventor: Kenneth L. Deckert, San Jose, Calif.

[73] Assignee: International Business Machines, Armonk, N.Y.

[21] Appl. No.: 293,813

[22] Filed: Aug. 17, 1981

[51] Int. Cl.³ .......................... G11B 5/60; G11B 17/32
[52] U.S. Cl. ...................................... 360/103; 360/122
[58] Field of Search ................ 360/103, 122, 128, 102

[56] References Cited

U.S. PATENT DOCUMENTS

| 3,170,045 | 2/1965 | Baumeister et al. | 360/103 |
| 4,214,287 | 7/1980 | Stromsta et al. | 360/103 |
| 4,218,715 | 8/1980 | Garnier | 360/103 |
| 4,261,024 | 4/1981 | Desserre | 360/103 |
| 4,285,019 | 8/1981 | Scott et al. | 360/103 |

FOREIGN PATENT DOCUMENTS 55-105857 8/1980 Japan ................................... 360/103

OTHER PUBLICATIONS

IBM Technical Disclosure Bulletin, vol. 5, No. 3, Aug. 1962, p. 16.

*Primary Examiner*—Stuart N. Hecker
*Attorney, Agent, or Firm*—N. N. Kallman; Otto Schmid, Jr.

[57] ABSTRACT

The air bearing surface of a self-loading magnetic head slider has two side rails and a recessed section therebetween. The air bearing surface has a cylindrical or parabolic crowned shape to effectuate very small spacing between the trailing end of the slider, which supports magnetic transducer means in flying relation to a moving magnetic medium.

8 Claims, 3 Drawing Figures

SELF-LOADING MAGNETIC HEAD AIR BEARING SLIDER

DESCRIPTION

1. Technical Field

This invention relates to a self-loading magnetic head and in particular to a low load air bearing head slider.

2. Background Art

A magnetic head air bearing slider of the type disclosed herein is described in U.S. Pat. No. 3,855,625 issued to Garnier et al and assigned to the same assignee. The air bearing slider is formed with spaced side rails and a cross rail connecting the side rails. A taper flat section or stepped section is formed at the leading edge of each rail, and a rectangular recessed section is formed between the side rails. Magnetic transducers are located at the trailing edge of the slider at the rail areas.

A self-loading contact slider having a curved contoured surface is described in IBM Technical Disclosure Bulletin, Vol. 13, No. 9, February 1971, page 2507. The publication describes a head slider that has three separate pads, with one pad being at the rear. The transducer at the rear pad contacts the medium.

SUMMARY OF THE INVENTION

A self-loading magnetic head air bearing slider comprises a support structure having leading and trailing ends; side rails along a surface of the support structure with a recessed section formed between the side rails, characterized in that the surface has a cylindrical or parabolic crowned shape so that minimum spacing between the slider and a moving magnetic medium occurs at the trailing end.

An advantage of this invention is the provision of a self-loading air bearing slider that realizes improved stability.

Another advantage of this invention is the provision of an air bearing slider for a flying magnetic head used in a disk file that eliminates the problem of head-to-disk stiction.

Another advantage is the provision of a magnetic head air bearing slider that is less sensitive to variations in disk surface topography and disk rotary speed.

BRIEF DESCRIPTION OF THE DRAWING

The invention will be described in detail with reference to the drawing in which.

DISCLOSURE OF THE INVENTION

Figure 1:
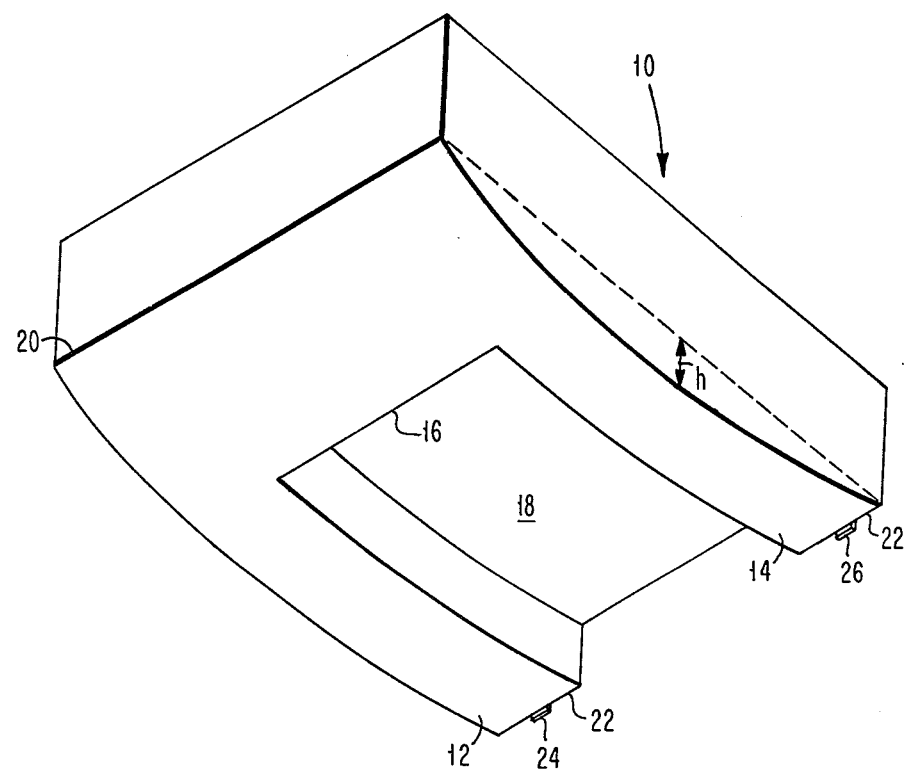
FIG. 1 is a 3-dimensional front bottom view of the air bearing slider, made in accordance with this invention.
Figure 2:
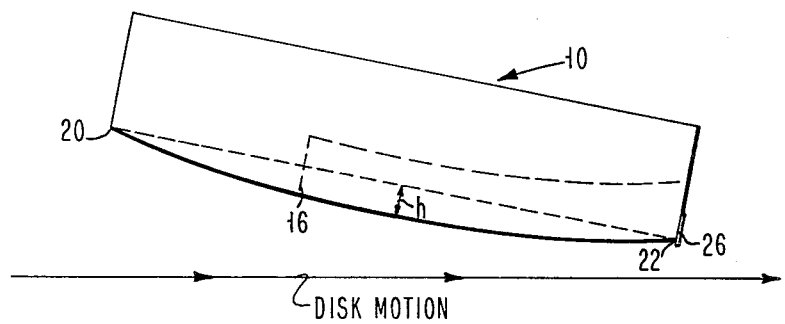
FIG. 2 is a side elevation sectional view of the slider of FIG. 1.

With reference to the FIGURES of the drawing, the air bearing surface of a magnetic head slider 10, made in accordance with this invention, is formed with two side rails 12 and 14, and a front connecting section 16 joining the two side rails. The inner sides of the two rails and front section border on a recessed section 18 that is formed by etching. The recessed section 18 extends to the trailing end of the air bearing surface of the slider and is open at the trailing end. Magnetic transducers 24 and 26, preferably of the thin film type, are deposited at the trailing edge of each rail.

In accordance with this invention, the side rails are lapped or ground so that the rails 12 and 14 are shaped to be curvilinear from the leading edge 20 to the trailing edge 22. The curvature of the crown-shaped rails may be parabolic or cylindrical, preferably having a crown height h in the range of 0.75–1.25 microns. The crown height h is measured at the middle of the rail 12 or 14 between the leading edge and the trailing end. The curvilinear rails in combination with the etched recessed section determine the flying height and attitude of the head slider relative to a moving magnetic medium, such as a rotating disk.

In one implementation, the crown height of the rails is about 1 micron, the slider width is about 3 mm, the slider length is about 4 mm, the side rails are 2.6 mm in length and 0.4 mm in width, the front section is 1.4 mm long from the leading end of the slider to the beginning of the recessed section, and the recessed section is about 10 microns in depth.

Figure 3:
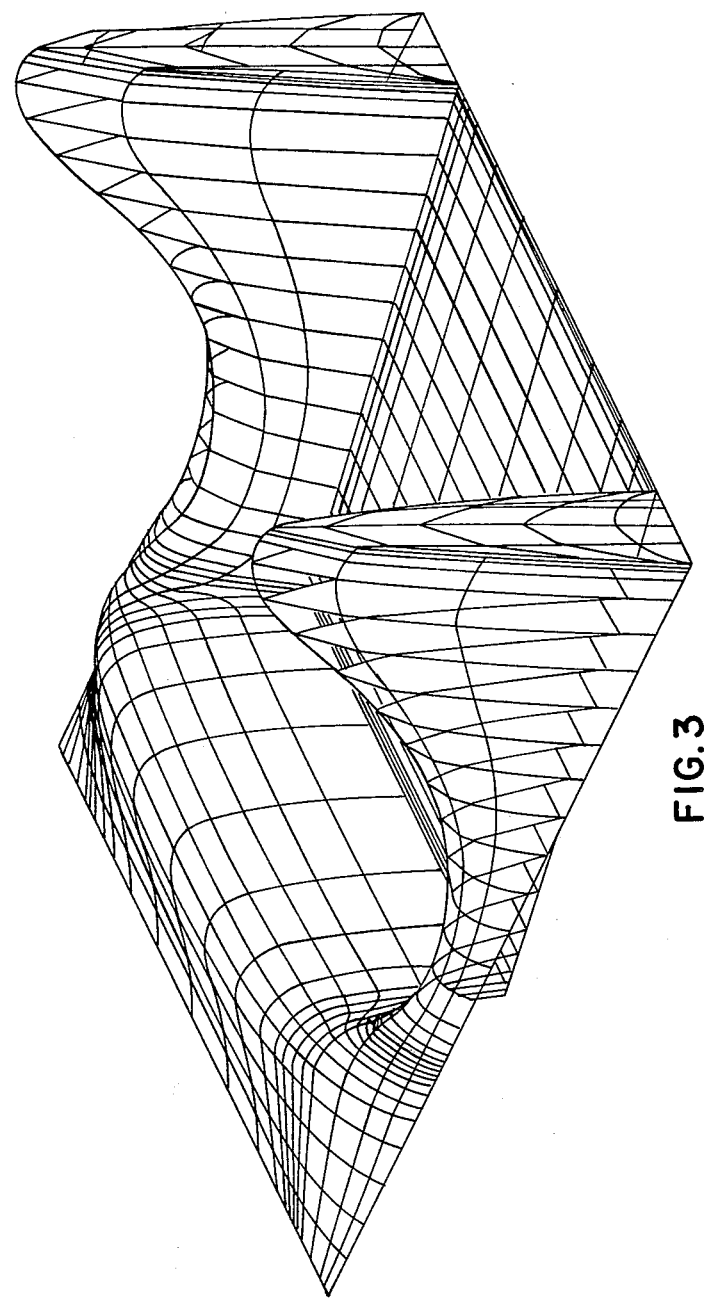
FIG. 3 is a representation of a pressure profile indicating a distribution of pressure, as measured along the air bearing surface of the slider.

With this design, stiction of the air bearing head to a rotating magnetic disk is eliminated during startstop operation. The flying height of the air bearing slider is less sensitive to variations of disk topography, and experiences less change from the inner diameter to the outer diameter of a disk. Improved stability of the slider is realized due to the shape of the pressure profile which has three peaks as depicted in FIG. 3. Also, by eliminating tapered corners, as used in the prior art, there is less damage to the disk and head, which may occur as a result of random asperity contacts between a disk and the head.

I claim:

1. A self-loading magnetic head slider assembly comprising:
   - a support structure having leading and trailing ends and a front section extending across the support structure from the leading end thereof;
   - side rails disposed longitudinally from the front section to the trailing end along the side edges of a surface of said support structure;
   - a recessed section formed between said side rails behind said front section;
   - at least one magnetic transducer deposited at the trailing end of one of said side rails;
   - characterized in that said side rails and said front section have a continuously curved convex shape in longitudinal section between said leading and said trailing end; and
   - said continuously curved convex shape of said front section and said side rails and said recessed section produce a combined pressure profile when said slider assembly is positioned adjacent a moving magnetic medium so that said slider assembly assumes an orientation with respect to said moving magnetic medium in which the minimum spacing between said slider assembly and said magnetic medium occurs at the trailing end of said slider assembly.

2. A self-loading magnetic head slider assembly as in claim 1 in which said continuously curved convex shape is cylindrical.

3. A self-loading magnetic head slider assembly as in claim 1 in which said continuously curved convex shape is parabolic.

4. A magnetic head slider assembly as in claim 1 wherein said continuously curved convex surface is an air bearing surface that cooperates with a magnetic medium in transducing relation.

5. A magnetic head slider assembly as in claim 1, wherein said recessed section is an etched area.

6. A magnetic head slider assembly as in claim 1, wherein said recessed section is open at said trailing end.

7. A magnetic head slider assembly as in claim 1, wherein said shaped rails have a crown height in the range of 0.75–1.25 microns between said leading and trailing ends.

8. A magnetic head slider assembly as in claim 1, wherein the depth of said recessed section is about 10 microns.

* * * * *